US012265351B2

(12) United States Patent
Katayama et al.

(10) Patent No.: US 12,265,351 B2
(45) Date of Patent: Apr. 1, 2025

(54) IMAGE FORMING SYSTEM

(71) Applicant: CANON KABUSHIKI KAISHA, Tokyo (JP)

(72) Inventors: Daisuke Katayama, Chiba (JP); Yoshiro Tsukada, Chiba (JP); Masami Hano, Chiba (JP); Shingo Hirota, Ibaraki (JP); Toshiyuki Yamada, Tokyo (JP); Taro Hanazato, Tokyo (JP); Kyohei Kikuchi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/226,115

(22) Filed: Jul. 25, 2023

(65) Prior Publication Data

US 2024/0036505 A1 Feb. 1, 2024

(30) Foreign Application Priority Data

Jul. 26, 2022 (JP) ................................ 2022-118393

(51) Int. Cl.
*G03G 15/20* (2006.01)
*G03G 15/00* (2006.01)

(52) U.S. Cl.
CPC .................. *G03G 15/6585* (2013.01); *G03G 2215/00801* (2013.01)

(58) Field of Classification Search
CPC .......... G03G 15/6582; G03G 15/6585; G03G 2215/00801; G06K 15/188
See application file for complete search history.

(56) References Cited

U.S. PATENT DOCUMENTS

| | | | | |
|---|---|---|---|---|
| 11,762,321 | B2 * | 9/2023 | Kitajima ............ | G03G 15/6585 399/67 |
| 2016/0350630 | A1 * | 12/2016 | Saito .................... | G06K 15/186 |
| 2017/0269517 | A1 * | 9/2017 | Ikeda ................. | G03G 15/6585 |
| 2019/0193415 | A1 | 6/2019 | Yamamoto | |

* cited by examiner

*Primary Examiner* — Hoang X Ngo
(74) *Attorney, Agent, or Firm* — Venable LLP

(57) ABSTRACT

An image forming system includes an image forming apparatus, a varnish applying apparatus, and a controller. A toner image formed on a recording material by the image forming apparatus on the basis of inputted first image data is a first toner image, and an image formed on the recording material by the varnish applying apparatus on the basis of inputted second image data is a varnish image. In a case that the varnish image is to be formed in a non-image region where the first toner image is not formed, before the varnish image is formed, a second toner image is formed with monochromatic toner by the image forming apparatus on a portion of the non-image region where the varnish image is to be formed.

12 Claims, 10 Drawing Sheets

IMAGE FORMING SYSTEM

FIELD OF THE INVENTION AND RELATED ART

The present invention relates to an image forming system including an image forming apparatus for forming a toner image on a recording material, and a varnish applying apparatus for forming a varnish image on the recording material.

Recently, separately from the toner image formed on a recording material with a developer, in order to decorate the toner image, a varnish image using colorless and transparent varnish is formed on the toner image. In United States Patent Application Publication No. US2019/0193415 A1, as an apparatus for forming the varnish image, a varnish applying apparatus (called varnish coater) capable of forming the varnish image by applying varnish capable of being solidified by ultraviolet radiation and then by solidifying the varnish through irradiation thereof with the ultraviolet radiation is disclosed.

SUMMARY OF THE INVENTION

According to an aspect of the present invention, there is provided an image forming system comprising: an image forming apparatus configured to form a toner image on a recording material; a varnish applying apparatus configured to apply varnish on the recording material to form a varnish image on the recording material; and a controller configured to control the image forming apparatus, in a case where the varnish image is formed in a non-image region where a first toner image is not formed, to form a second toner image with monochromatic toner on a portion where the varnish image is to be formed in the non-image region, before the varnish image is formed, wherein the toner image formed on the recording material by the image forming apparatus on the basis of inputted first image data is a first toner image, and an image formed on the recording material by the varnish applying apparatus on the basis of inputted second image data is the varnish image.

According to another aspect of the present invention, there is provided an image forming system comprising: an image forming apparatus configured to form a toner image on a recording material; a varnish applying apparatus configured to apply varnish on the recording material to form a varnish image on the recording material; and a controller configured to control the image forming apparatus, in a case where the varnish image is formed in a non-image region where a first toner image is not formed, to form a second toner image with monochromatic toner on a contour portion of an area where the varnish image is to be formed in the non-image region, before the varnish image is formed, wherein the contour portion is corresponding to a contour of the varnish image, and wherein the toner image formed on the recording material by the image forming apparatus on the basis of inputted first image data is a first toner image, and an image formed on the recording material by the varnish applying apparatus on the basis of inputted second image data is the varnish image.

Further features of the present invention will become apparent from the following description of exemplary embodiments with reference to the attached drawings.

Figure 4:
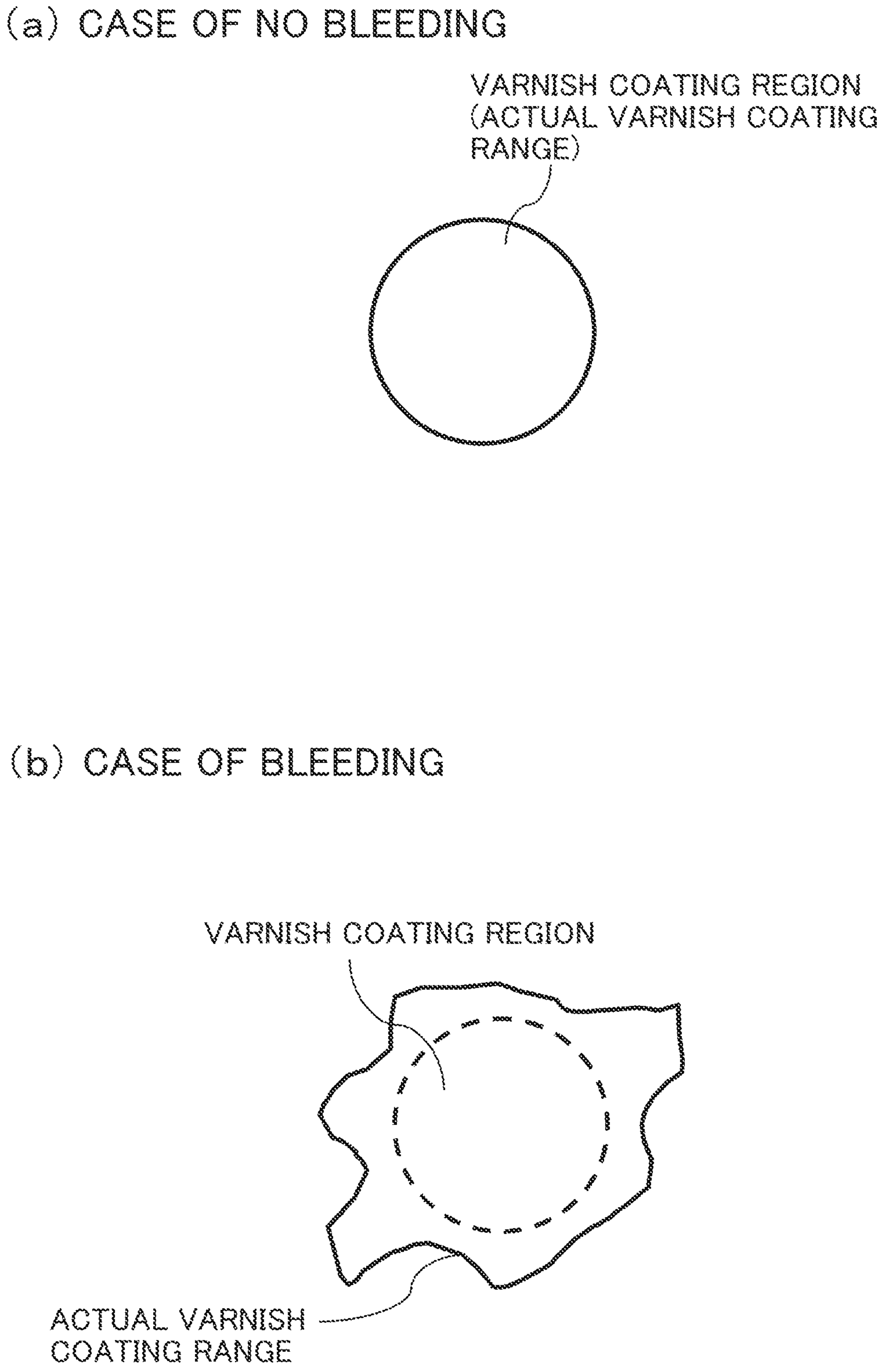

Part (a) of FIG. 4 is a schematic view showing the case where "bleeding" does not occur on the varnish image, and part (b) of FIG. 4 is a schematic view showing the case where the "bleeding" occurs on the varnish image.

Figure 5:
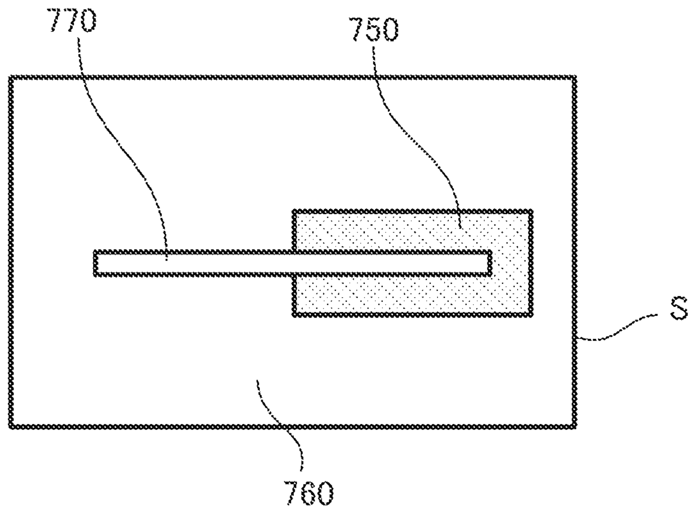

FIG. 5 is a schematic view for illustrating a discriminating method for discriminating occurrence or non-occurrence of the bleeding.

Figure 6:
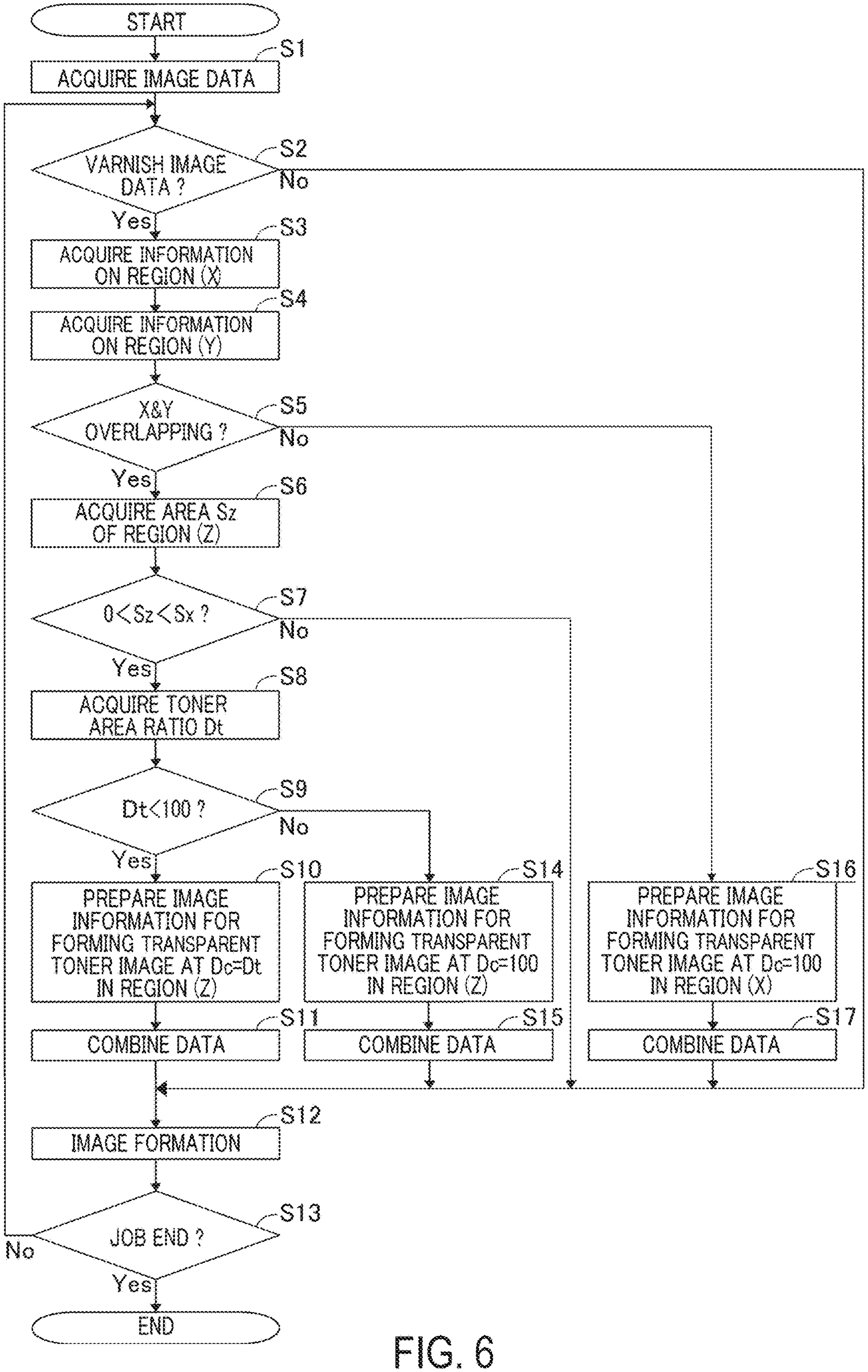

FIG. 6 is a flowchart showing an image forming process in a first embodiment.

Figure 7:
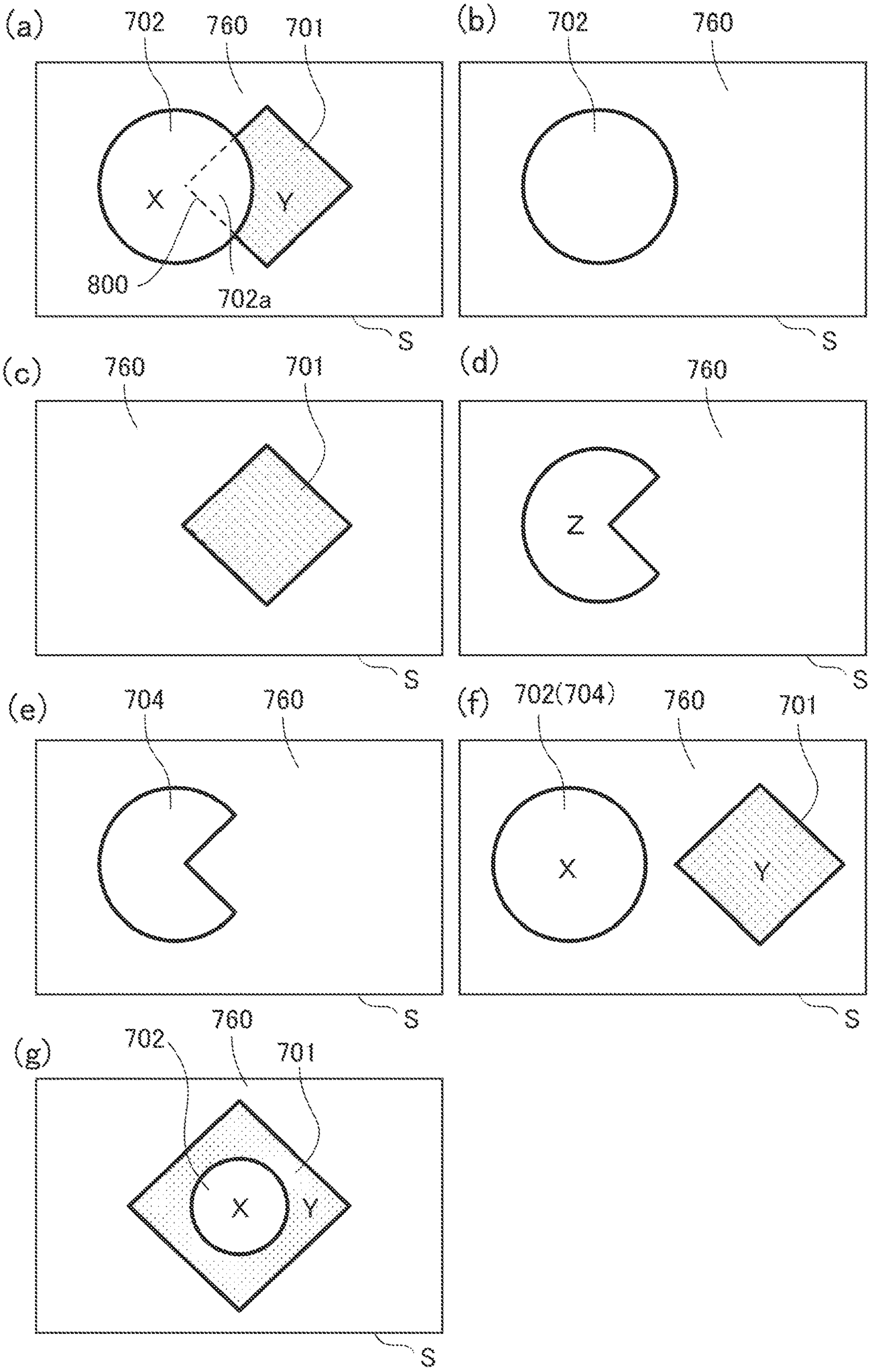

Part (a) of FIG. 7 is a schematic view showing the case where a part of a varnish image overlaps with a toner image, part (b) of FIG. 7 is a schematic view showing the varnish image, part (c) of FIG. 7 is a schematic view showing the toner image, part (d) of FIG. 7 is a schematic view showing a region of the varnish image in which the varnish image does not overlap with the toner image, part (e) of FIG. 7 is a schematic view showing a transparent toner image, part (f) of FIG. 7 is a schematic view showing the case where entirety of the varnish image does not overlap with the toner image, and part (g) of FIG. 7 is a schematic view showing the case where the entirety of the varnish image overlaps with the toner image.

Figure 8:
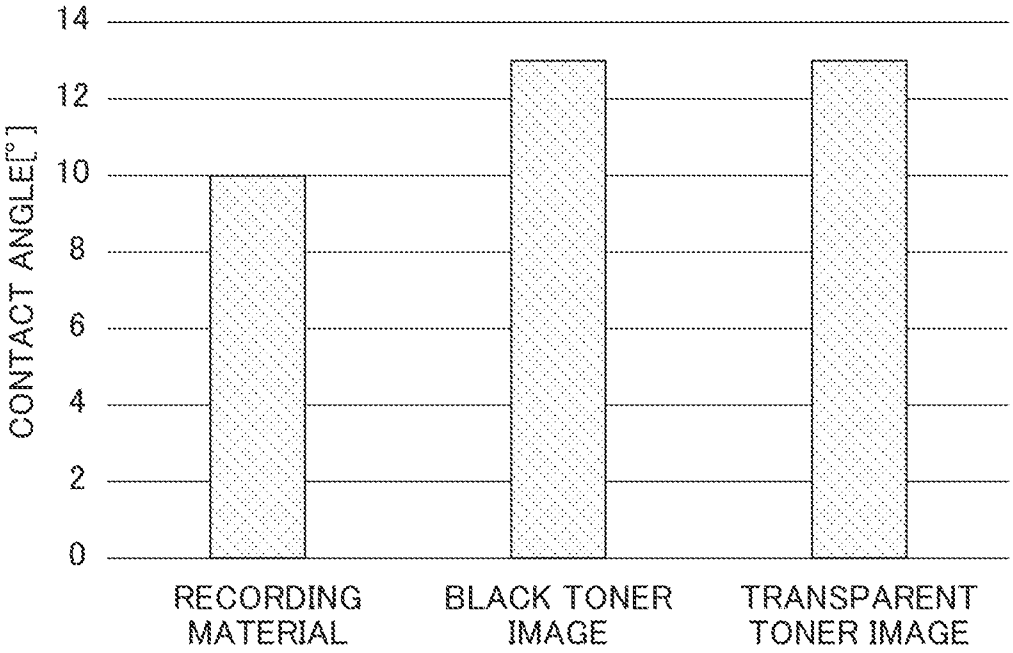

FIG. 8 is a graph showing a relationship between a contact angle of varnish with a recording material, black toner, and transparent toner.

Figure 9:
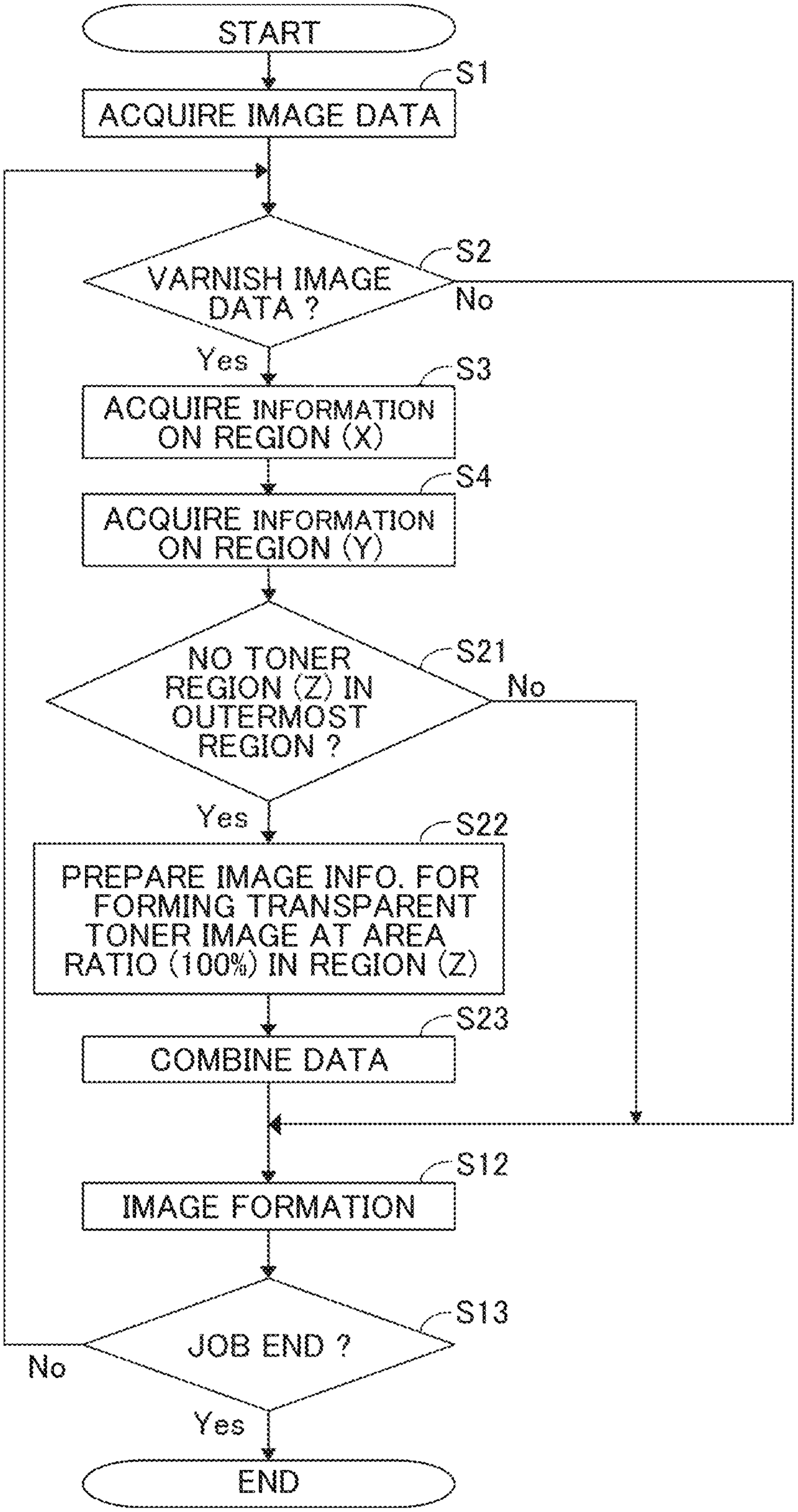

FIG. 9 is a flowchart showing an image forming process in a second embodiment.

Figure 10:
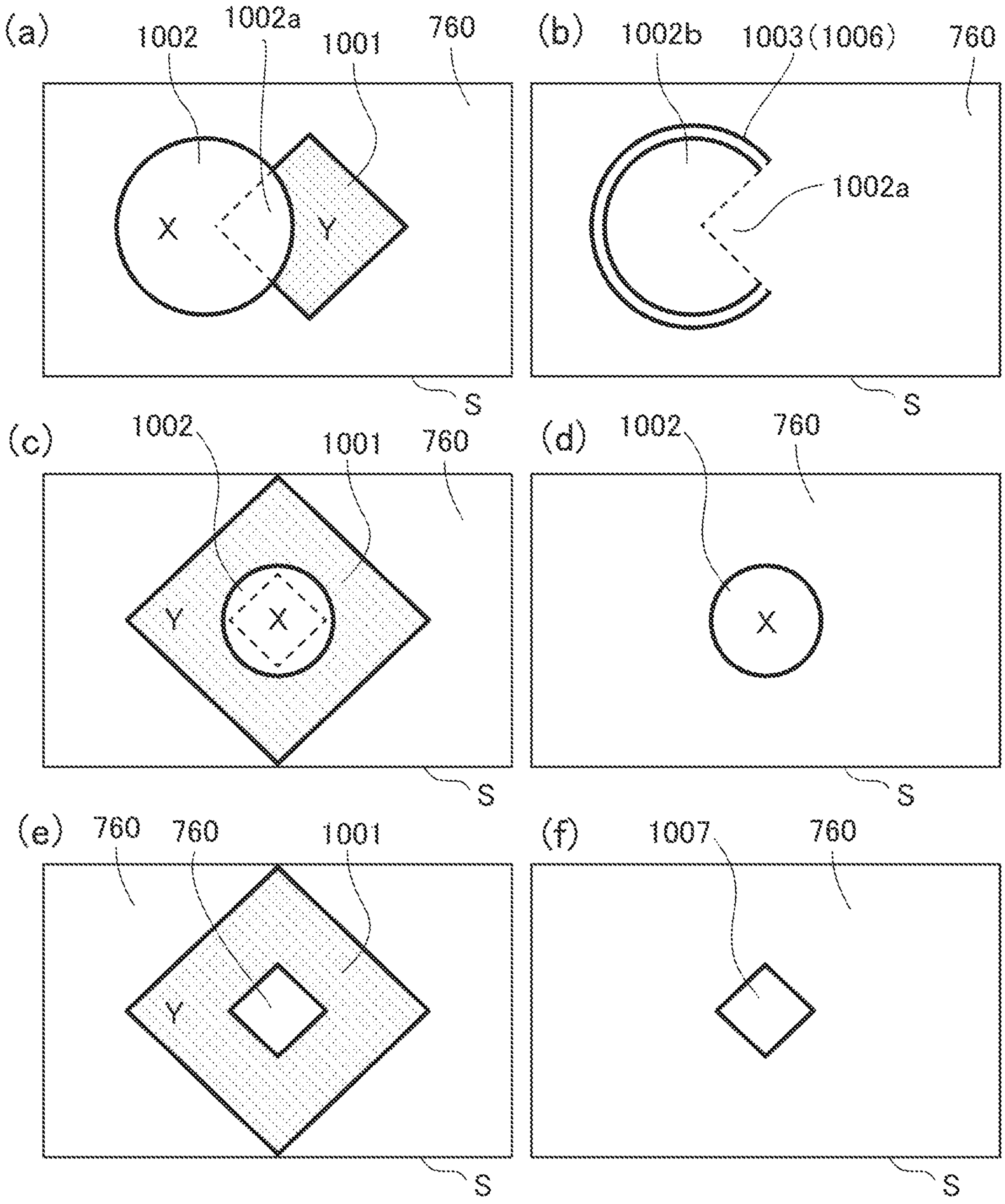

Part (a) of FIG. 10 is a schematic view showing the case where a part of a varnish image overlaps with a toner image, part (b) of FIG. 10 is a schematic view showing an outermost varnish region and a transparent toner image, part (c) of FIG. 10 is a schematic view showing another example of the case where a part of a varnish image overlaps with a toner image, part (d) of FIG. 10 is a schematic view showing the varnish image, part (e) of FIG. 10 is a schematic view showing the toner image, and part (f) of FIG. 10 is a schematic view showing a transparent toner image formed in the case of the first embodiment.

DESCRIPTION OF THE EMBODIMENTS

First Embodiment

Figure 1:
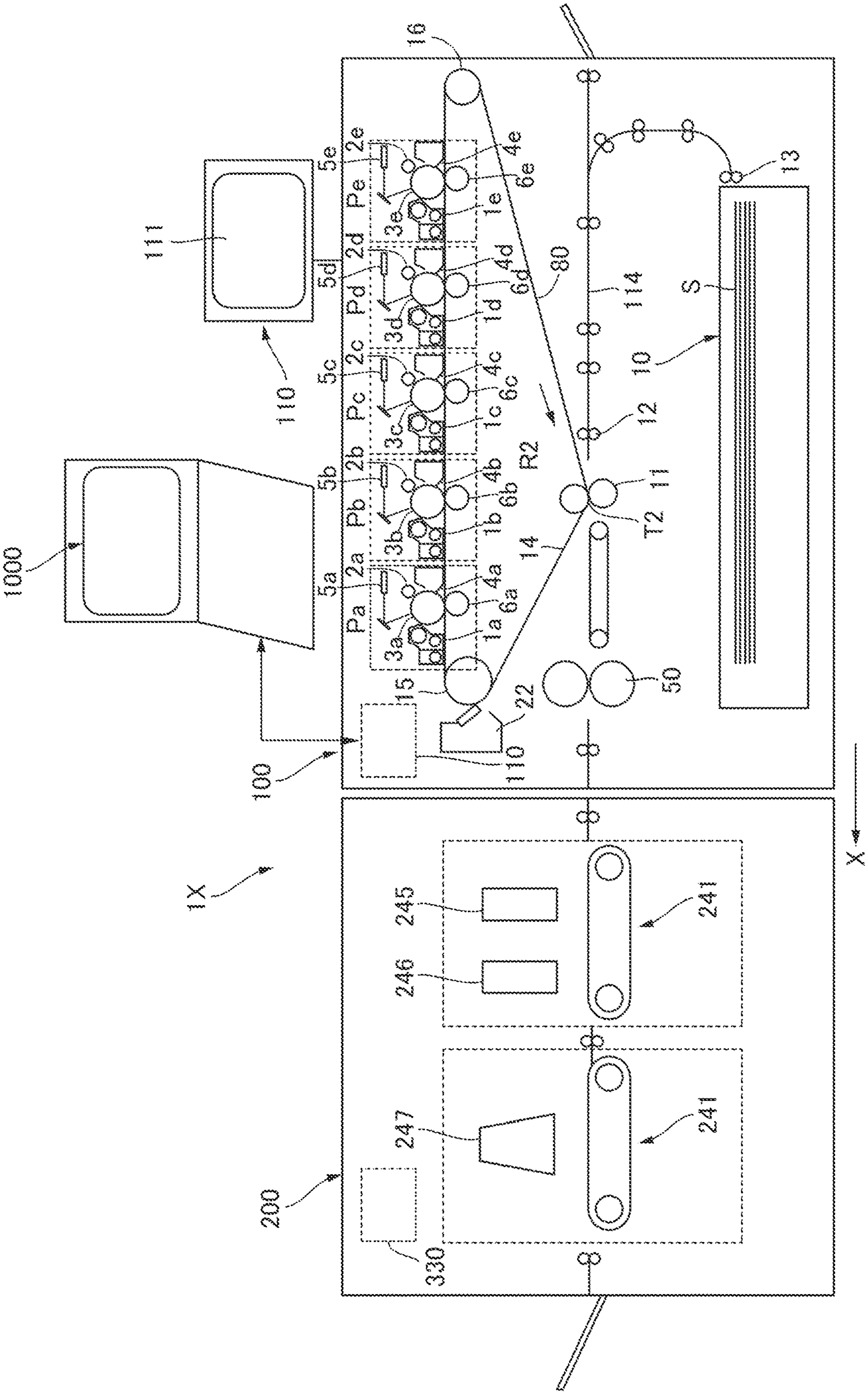
FIG. 1 is a schematic view showing a structure of an image forming system.

First, an image forming system 1X of this embodiment will be described using FIG. 1. The image forming system 1X shown in FIG. 1 includes an image forming apparatus 100 for forming a toner image on a recording material S and a varnish applying apparatus (referred to as a varnish coater) for forming a varnish image on the recording material S. The varnish coater 200 is a post-step unit retrofittable to the image forming apparatus 100 for expanding function, and the image forming apparatus 100 and the varnish coater 200 are connected to each other so as to be capable of delivering the recording material S therebetween. The image forming apparatus 100 and the varnish coater 200 are connected to each other by data input/output interfaces (not shown) so as to be capable of sending and receiving control signals and data therebetween. The recording material S on which the toner image is formed by the image forming apparatus 100 is conveyed toward the varnish coater 200 for the purpose of improving glossiness, water resistance, friction resistance, and the like of the toner image formed on the recording material S, so that the varnish image is formed on the recording material S separately from the toner image by the varnish coater 200. Formation of the varnish image by the varnish coater 200 will be described later.

Incidentally, although illustration is omitted, the image forming system 1X may include another post-step unit, such as a relay apparatus, a finisher apparatus, or the like. The relay apparatus is disposed between the image forming apparatus 100 and the varnish coater 200, and reverses and sends the recording material S, conveyed from the image forming apparatus 100, to the varnish coater 200 or sends the recording material S to the varnish coater 200 after temporarily stacking the recording material S. The finisher apparatus performs, for example, punching such that the recording material S is perforated or stapling such that a plurality of recording materials S are bundled and stapled, and then the perforated recording material S or the bundle of the stapled recording materials S is discharged. Further, in addition to these post-step units, for example, the image forming system 1X may include a recording material supplying apparatus (not shown) capable of accommodating recording materials S therein in a large amount, in which the recording material S may be supplied from the recording material supplying apparatus to the image forming apparatus 100.

<Image Forming Apparatus>

The image forming apparatus 100 will be described. The image forming apparatus 100 is an electrophotographic full-color printer of a tandem type. The image forming apparatus 100 includes image forming portions Pa, Pb, Pc, and Pd for forming images of yellow, magenta, cyan, and black, respectively. Further, in the case of this embodiment, in addition to the image forming portions Pa, Pb, Pc, and Pd, an image forming portion Pe for forming an image of specific toner is provided. The image forming apparatus 100 forms a toner image on the recording material S on the basis of image data sent from an original reading device (not shown) connected to, for example, the image forming apparatus 100 or from an external device 1000 such as a personal computer connected to the image forming apparatus 100. As the recording material S, it is possible to cite sheet materials, such as plain paper, thick paper, roughened paper, uneven paper and coated paper.

A feeding process of the recording material S in the image forming apparatus 100 will be described. The recording materials S are accommodated in a cassette 10 in a stacked form, and are sent from the cassette 10 in synchronism with an image forming timing by a supplying roller 13. The recording material S sent by the supplying roller 13 is conveyed toward a registration roller pair 12 provided in the course of a feeding (conveying) passage 114. Then, the recording material S is subjected to oblique movement correction or timing correction by the registration roller pair 12, and thereafter, is sent to a secondary transfer portion T2. The secondary transfer portion T2 is a transfer nip formed by an inner secondary transfer roller 14 and an outer secondary transfer roller 11, and the toner image is transferred onto the recording material S in response to application of a secondary transfer voltage to the outer secondary transfer roller 11.

As regards the recording material S feeding process until the above-described secondary transfer portion T2, an image forming process of the image sent to the secondary transfer portion T2 at a similar timing will be described. First, although the image forming portions will be described, the respective color image forming portions Pa, Pb, Pc, Pd, and Pe are constituted substantially similar to each other except that colors of toners used in developing devices 1*a*, 1*b*, 1*c* and 1*d* are yellow (Y), magenta (M), cyan (C), black (K), and specific color (T), respectively, which are different from each other. Therefore, in the following, as a representative, the image forming portion Pd for black will be described, and other image forming portions Pa, Pb, Pc, and Pe will be omitted from description. Incidentally, the toner of the specification (T) is monochromatic toner such as transparent toner or white toner, for example.

The image forming portion Pd is principally constituted by the developing device 1*d*, a charging device 2*d*, a photosensitive drum 3*d*, a photosensitive drum cleaner 4*d*, an exposure device 5*d*, and the like. A surface of the photosensitive drum 3*d* is electrically charged uniformly in advance by the charging device 2*d*, and thereafter, an electrostatic latent image is formed by the exposure device 5*d* driven on the basis of a signal of image information. Then, the electrostatic latent image formed on the photosensitive drum 3*d* is developed into a toner image with use of a developer by the developing device 1*d*. Then, the toner image formed on the photosensitive drum 3*d* is primary-transferred onto an intermediary transfer belt 80 in response to application of a primary transfer voltage to a primary transfer roller 6*d* disposed opposed to the image forming portion Pd while sandwiching the intermediary transfer belt 80 therebetween. Primary transfer residual toner slightly remaining on the photosensitive drum 3*d* is collected to the photosensitive drum cleaner 4*d*.

The intermediary transfer belt 80 is stretched by the inner secondary transfer roller 14, and stretching rollers 15 and 16, and is driven in an arrow R2 direction. In the case of this embodiment, the stretching roller 16 also functions as a driving roller for driving the intermediary transfer belt 80. The respective color image forming processes are carried out at timings when the associated toner image is superposedly transferred onto the upstream toner image primarily transferred onto the intermediary transfer belt 80. As a result, finally, a full-color toner image is formed on the intermediary transfer belt 80 and is conveyed to the secondary transfer portion T2. Incidentally, secondary transfer residual toner after passing through the secondary transfer portion T2 is removed from the intermediary transfer belt 80 by a transfer cleaner 22.

In the above, by the above-described feeding process and the above-described image forming process, in the secondary transfer portion T2, the timing of the recording material S and the timing of the full-color toner image coincide with each other, so that secondary transfer is carried out. Thereafter, the recording material S is conveyed to a fixing device 50, in which heat and pressure are applied to the recording material S, so that the toner image is fixed on the recording material S. The fixing device 50 nips and feeds the recording material S on which the toner image is formed, and applies heat and pressure to the fed recording material S, so that the fixing device 50 fixes the toner image on the recording material S. That is, the toner of the toner image formed on the recording material S is melted and mixed, and is fixed as the full-color image on the recording material S. Thus, a series of the image firming processes is ended. Then, in the case of this embodiment, the recording material S on which the toner image is fixed is conveyed from the image forming apparatus 100 to the varnish coater 200.

Developer

In this embodiment, a two-component developer containing the toner and a carrier is used. The toner contains a binder resin, a colorant, and a parting agent (wax). As the binder resin, a known binder resin can be used. For example, it is possible to use resin materials such as a vinyl copolymer represented by a styrene-(meth)acrylic copolymer, a polyester resin, a hybrid resin obtained by chemically bonding a vinyl copolymer unit and a polyester unit to each other, an epoxy resin, a styrene-butadiene copolymer, and the like. As the colorant, it is possible to use known colorants for yellow (Y), magenta (M), cyan (C), and black (K), respectively.

As the parting agent, for example, it is possible to cite aliphatic hydrocarbon waxes such as low-molecular weight polyethylene, low-molecular weight olefin copolymer wax, microcrystalline wax, Fischer-Tropsch wax, and paraffin wax; oxide of the aliphatic hydrocarbon wax such as oxidized polyethylene wax; their block copolymers; waxes principally containing fatty acid esters such as carnauba wax and montanic acid ester wax; ester wax which is synthetic reaction product between higher aliphatic acid, such as behenyl behenate or behenyl stearate, and higher alcohol; fatty acid esters a part or all of which is deoxidized, such as deoxidized carnauba wax; and the like.

The image data includes toner image data for a toner image formed by the image forming apparatus 100 and varnish image data for a varnish image formed by the varnish coater 200. Similar to the toner image data (first image data), as regards the varnish image data (second image data), an individual varnish image is associated with a coordinate of an image forming region on the recording material S for each of pages.

<Varnish Coater>

Figure 2:
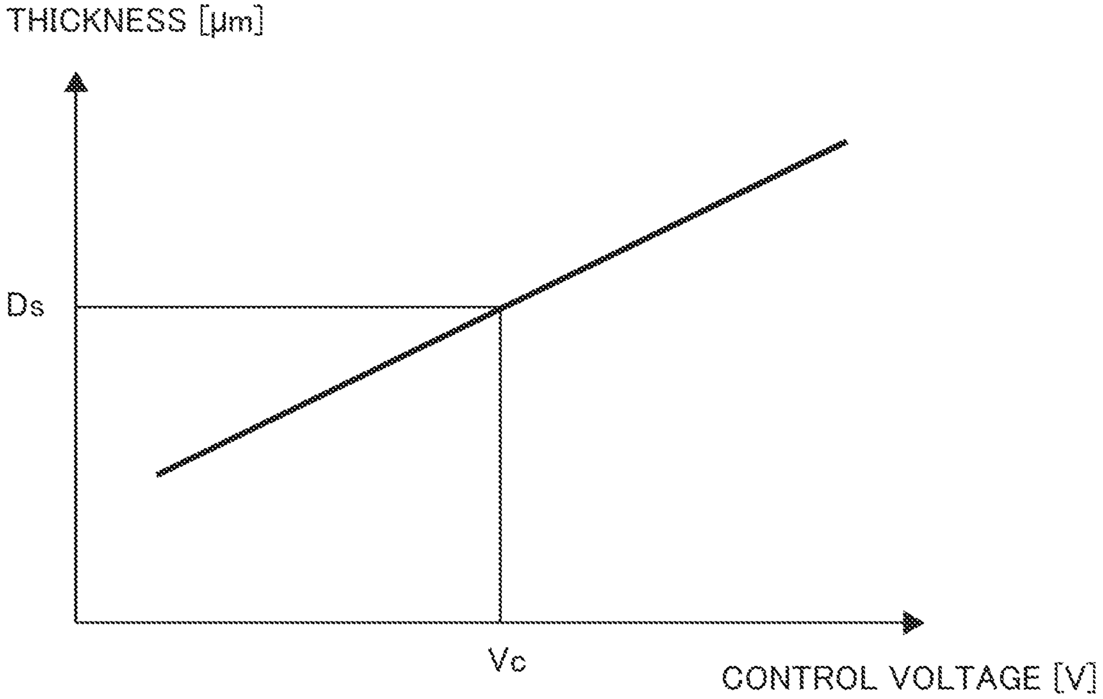
FIG. 2 is a graph showing a relationship between a control voltage and a thickness which relate to varnish image formation.

Next, the varnish coater 200 will be described using FIGS. 1 and 2. The varnish coater 200 is a varnish applying apparatus of an ink jet type capable of forming varnish images such as characters, diagrams, graphics, and the like, which are desired by users. In the case of the ink jet type, varnish is ejected as droplets toward the recording material S, so that the varnish is deposited on the recording material S and thus the varnish image is formed. The varnish coater 200 is capable of forming the varnish image on the basis of the varnish image data included in the image data. Incidentally, as the varnish, various varnishes such as an aqueous varnish, an oil varnish, and a UV varnish may be used, and in the following, the varnish coater 200 for forming a varnish image with the UV varnish solidified by UV irradiation will be described as an example.

The varnish coater 200 includes a sheet feeding portion 241, a position detecting portion 245, a varnish ejecting portion 246, and a varnish solidifying portion 247. The sheet feeding portion 241 feeds the recording material S while attracting the recording material S to a belt feeding surface by an air sucking device (not shown) through holes formed in a feeding belt 242. Along a sheet feeding passage of this sheet feeding portion 241, in an order from an upstream side toward a downstream side of a feeding direction (arrow X direction) of the recording material S, the position detecting portion 245, the varnish ejecting portion 246, and the varnish solidifying portion 247 are disposed. The position detecting portion 245 is a detecting portion using a CCD, or the like, for example, and with respect to the recording material S fed while being sucked on the belt feeding surface, the position detecting portion 245 detects each of a position of a leading end of the recording material S with respect to the feeding direction, a position of each of opposing end portions with respect to a widthwise direction, and a position of the toner image on the recording material S. The position of the toner image is detected by the position detecting portion 245, so that the varnish coater 200 is capable of overprinting the varnish image superposedly on the toner image.

The varnish ejecting portion 246 forms the varnish image on the recording material S by ejecting the UV varnish onto one surface (side) of the recording material S fed by the sheet feeding portion 241. The varnish ejecting portion 246 includes a plurality of print heads (not shown). The print heads are, for example, heads of a line type, in which a plurality of ejection ports (not shown) are arranged and disposed over a range covering a maximum width of the recording material S on which the image is capable of being formed by the varnish coater 200, in the widthwise direction crossing the feeding direction of the recording material S. A varnish ejecting method of the print heads may employ a type using heat generating elements, a type using piezo electric elements, a type using electrostatic elements, a type using MEMS elements, and the like. Although illustration is omitted, the UV varnish is supplied from a tank to the associated one of the print heads through a tube.

A thickness of the varnish image is influenced by an application amount per unit area of the UV varnish onto the recording material S. The varnish amount (varnish application amount) can be changed by adjusting a varnish ejecting amount from the print heads. For example, in the case of the type using the piezoelectric elements, as shown in FIG. 2, the varnish ejection amount varies depending on adjustment of a control voltage, and the thickness of the varnish image is adjusted depending on an increase and a decrease in varnish ejection amount per unit area. In the case of this embodiment, the thickness of the varnish image is adjusted in a range of, for example, "5-100 μm", preferably "10-70 μm".

Further, a resolution of the varnish image capable of being formed by to the varnish coater 200 is, for example, "600 dpi", and in that case, the line width of the varnish image is adjusted in a "600 dpi" unit. Incidentally, the above-described range of the thickness of the varnish image, the resolution of the varnish image, and an adjusting range of the line width of the varnish image may be appropriately changed depending on the varnish ejecting method of the print heads in the varnish coater 200, a kind of the varnish, and the like.

Returning to FIG. 1, the recording material S on which the varnish image is formed on one surface thereof by the varnish ejecting portion 246 is sent by the sheet feeding portion 241 to the varnish solidifying portion 247 positioned downstream of the varnish ejecting portion 246 with respect to the feeding direction, and then the UV varnish on the recording material S is solidified by the varnish solidifying portion 247. The varnish solidifying portion 247 as a UV irradiation portion includes a UV lamp, and the UV lamp irradiates the UV varnish with UV radiation (UV rays) of a wavelength corresponding to the varnish. The UV lamp is disposed in an almost entire region of the recording material S with respect to the widthwise direction so as to be capable of emitting the UV light (UV radiation), and is turned on only during passing of the recording material S. As described above, the varnish image is overprinted superposedly on the toner image formed on the recording material S.

The UV varnish used in this embodiment contains, as a main component, a photosensitive resin, a photosensitive monomer, a photoinitiator, an additive, and the like. As the photosensitive resin, for example, acrylic resin or the like having a (meth)acryloyl group is cited. As the photosensitive monomer, for example, a monomer, an oligomer, or the like in which at least one (meth)acryloyl group is contained in a molecule is cited. As the photoinitiator, for example, actophenone, benzoin ethyl ether, 1-hydroxycyclohexyl phenyl ketone, or the like is cited. As the additive, for example, wax, plasticizer, leveling agent, solvent, polymerization inhibitor, antioxidant, photosensitizer, antifoaming agent, or the like is cited. The UV varnish may contain one or two or more species of these materials. Contents of respective components are not particularly limited, but it is preferable that the UV varnish contains the photosensitive resin in "1-20 wt. %", the photosensitive monomer in "30-70 wt. %", the photoinitiator in "5-15 wt. %", and the additive in "5 wt. %" or less, for example. As the UV varnish, it is possible to use, for example, "UV L Carton OP varnish (trade name)", "UVL Gloss OP varnish (tradename)", "UV Matt OP varnish (trade name)" and the like (manufactured by T&K TOKA CO., Ltd.).

Next, a control constitution of an image forming control system in the image forming system 1X will be described using FIG. 3 while making reference to FIG. 1. In this embodiment, an example in which the image forming apparatus 100 (specifically, the main controller 101) unitarily manages and controls an operation instruction to the varnish coater 200 was cited. Incidentally, to a main controller 101 and a varnish processing controller 330 which are described later, in addition to the devices (portions) illustrated in FIG. 3, various devices such as motors and power sources are connected, but are not the main object of the present invention herein, and therefore, will be omitted from illustration and description.

Figure 3:
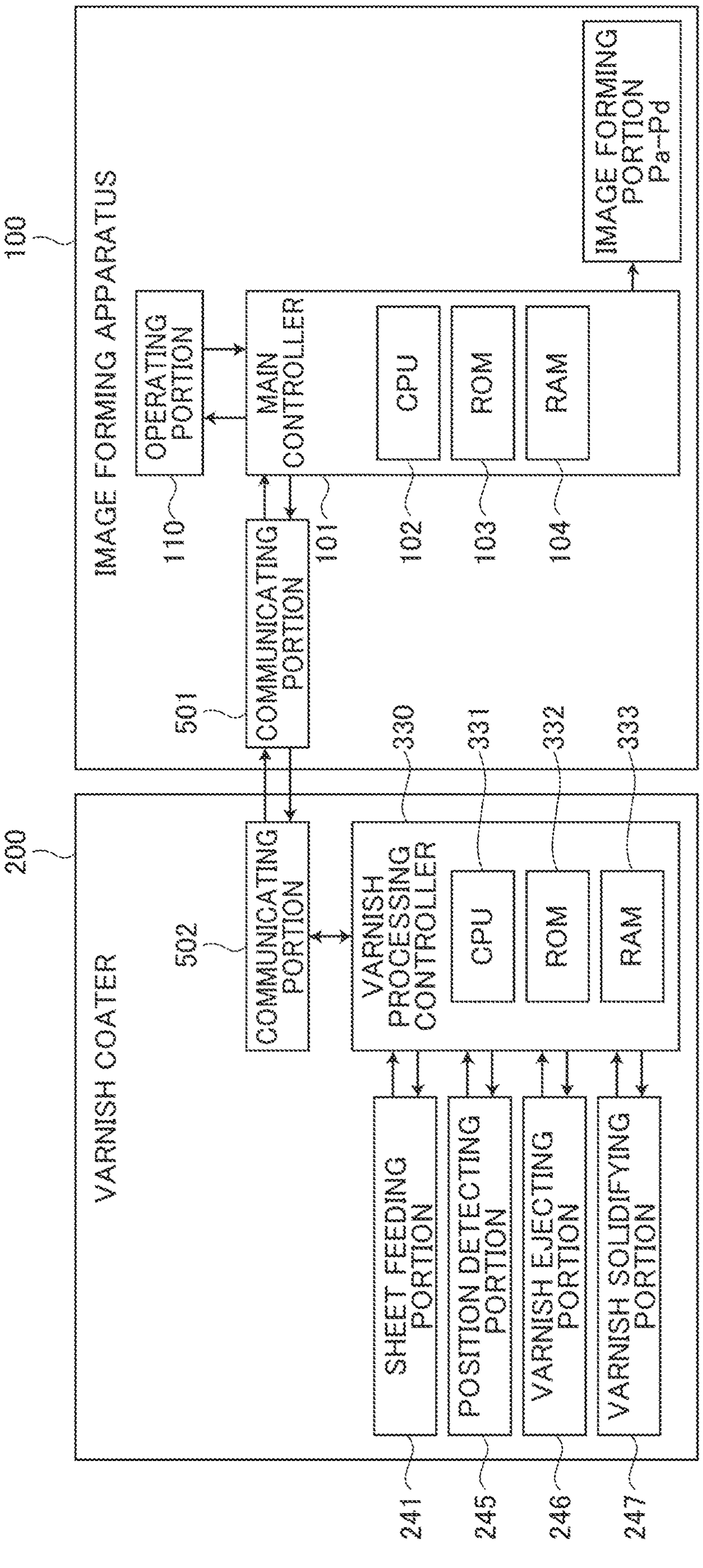
FIG. 3 is a control block diagram of an image formation control system in the image forming system.

In the image forming system 1X of this embodiment, as shown in FIG. 3, to the main controller 101 as a controller, the varnish processing controller 330 is connected via communication units 501 and 502 so as to be capable of communicating operation instructions and various data. In accordance with the operation instructions from the main controller 101, the varnish processing controller 330 causes the varnish coater 200 to operate. That is, while the main controller 101 controls the operation of the image forming apparatus 100, the main controller 101 is capable of controlling entirety of the image forming system 1X including the varnish coater 200 by sending the operation instructions and the various data to the varnish coater 200.

The above-described main controller 101 and the above-described varnish processing controller 330 may have the same constitution. For example, each of the controllers includes a CPU (central processing unit), a ROM (read only memory), and a RAM (random access memory).

The main controller 101 includes a CPU 102, a ROM 103, and a RAM 104. In the ROM 103, various programs such as "image forming processing" (see FIG. 5) (described later) are stored. In the RAM 104, various data such as image data acquired from an operating portion 110 or an external device 1000 (see FIG. 1) are stored. Further, the RAM 104 is capable of temporarily storing a calculation (computation) processing result or the like with execution of the various programs.

The image forming apparatus 100 includes an operating portion 110 including, for example, a liquid crystal display portion 111 (see FIG. 1), and the operating portion 110 is connected to the main controller 101. The operating portion 110 is, for example, a touch panel. On the liquid crystal display portion 111, various screens presenting the various programs and various data or the like can be displayed by the operating portion 110. Further, the operating portion 110 receives input of a start of the various programs and input of the various data, and the like, depending on a screen touch operation by a user. On the touch panel, a screen including various buttons, switches, and the like as keys switches is displayed.

The user is capable of inputting a start of an image forming job from the operating portion 110. In the case where the start of the "image forming job" is inputted, the CPU 102 executes the "image forming processing (problem)" (see FIG. 6) stored in the ROM 103. With this execution, together with the image forming apparatus 100, the varnish coater 200 is operated.

The varnish processing controller 330 includes a CPU 331, a ROM 332, and a RAM 333. The CPU 331 causes the sheet feeding portion 241, the position detecting portion 245, the varnish ejecting portion 246, and the varnish solidifying portion 247 of the varnish coater 200 to operate on the basis of a control program stored in the ROM 332. When the varnish processing controller 330 receives the varnish image data from the main controller 101, the varnish processing controller 330 causes the RAM 333 to store the received data, and causes the varnish coater 200 so as to form the varnish image on the recording material S on the basis of this varnish image data.

Incidentally, in a conventional case, compared with the varnish image formed superposedly on the toner image on the recording material S, "bleeding" was liable to occur on the varnish image formed at a white background portion where the toner image is not formed on the recording material S. Part (a) of FIG. 4 shows the case where the "bleeding" does not occur on the varnish image, and part (b) of FIG. 4 shows the case where the "bleeding" occurred.

The varnish is applied in a predetermined varnish coating region (in a circular region in this case) determined in advance for every varnish image on the basis of the varnish image data. In the case where the varnish does not bleed (spread), as shown in part (a) of FIG. 4, an actual varnish image (actual varnish coating range) formed on the recording material does not bleed from the predetermined varnish coating region and becomes a circle. On the other hand, in the case where the varnish bleeds, as shown in part (b) of FIG. 4, an actual varnish image (actual varnish coating range indicated by a solid line is capable of largely protruding from the varnish coating region.

Ease of bleeding of the varnish is different depending on wettability. In general, the wettability shows ease of deposition of a liquid on a solid surface, and is evaluated by a magnitude of a contact angle of the liquid to the solid surface. With a smaller contact angle of the liquid, the wettability is higher, so that the varnish is liable to bleed. The "bleeding" of the varnish is a phenomenon that in the case where the varnish in the form of droplets is ejected to a portion where the wettability is high, i.e., the contact angle of the liquid is low, the varnish is not maintained as a droplet shape, but spreads from a predetermined range.

On the recording material S, wettability of the white background portion is higher than wettability of a portion where the toner image is formed, so that the varnish is liable to cause the "bleeding" at the white background portion. For example, in an example shown in part (a) of FIG. 4, in the case where a circular toner image is formed in a predetermined toner image region at the same portion as the varnish coating region and a circular varnish image is formed on the circular toner image, the varnish does not readily cause the "bleeding". On the other hand, in the case where the circular varnish image is formed on the white background portion, the varnish is liable to cause the "bleeding". Conventionally, due to the "bleeding" of the varnish which can occur on the white background portion, as show in part (b) of FIG. 4, there was a liability that the varnish image protrudes from the varnish coating region. Particularly, in the case where the varnish image is formed so as to extend over the toner image and the white background portion, in the varnish coating region in which a single varnish image is formed, there is a region different in contact angle of the varnish, and therefore, the varnish bleeds and thus wets and spreads in this region in which the contact angle of the varnish is low, so that the varnish image can largely protrude from the varnish coating region.

Here, a measuring method of the contact angle of the varnish will be described using FIG. 5. The wettability can be evaluated by the contact angle of the liquid to the solid surface as described above, and for example, as a method for digitizing the wettability, it is possible to cite a liquid droplet method. In the liquid droplet method, a liquid droplet is contacted to and deposited on a sample surface, and after the deposition of the liquid droplet, an image acquired by a personal computer or the like is analyzed, and then an angle formed with the sample surface is determined as a contact angle θ.

As shown in FIG. 5, on the surface of the recording material S, a rectangular-shaped solid black image 750 and a bar-like varnish image 770 extending over the solid black image 750 and a white background portion 760 were formed, and then, each of a contact angle of the varnish to the solid black image 750 and a contact angle of the varnish to the white background portion 760 was measured.

As the recording material S, "OK Top Coat" (A3 size, basis weight: 127.9 (g/m$^2$), manufactured by Oji Paper Co., Ltd.) was used. As the varnish coater, "DDC-810 (manufactured by Duplo Corp.) was used. As a result, the contact angle of the varnish to the solid black image 750 was "13°", and the contact angle of the varnish to the white background portion 760 was "10°".

Occurrence or non-occurrence of the "bleeding" can be discriminated by a ratio of a varnish line width on the white background portion 760 to a varnish line width on the solid black image 750 in the varnish image 770 after solidification. For example, if this varnish line width ratio is "110%" or more, it can be said that the "bleeding" occurs, and the varnish line width on the white background portion 760 becomes broader than the varnish line width on the solid black image 750. Incidentally, in the case of the varnish image 770 extending over the solid black image 750 and the white background portion 760, in order to suppress the "bleeding" of the varnish, it is preferable that a difference between the contact angle of the varnish to the solid black image 750 and the contact angle of the varnish to the white background portion 760 is smaller. For example, when the difference in contact angle is "3°" or less, the "bleeding" does not readily occur on the varnish image.

<Image Forming Processing>

Next, "image forming processing" in this embodiment will be described using FIGS. 6 to 8 while making reference to FIG. 3. FIG. 6 is a flowchart showing the image forming processing in the first embodiment (this embodiment). The "image forming processing" is started by the main controller 110 with input of a start of an image forming job and is repeated until an end of the image forming job.

As shown in FIG. 6, the main controller 101 acquires image data stored in the RAM 104 with the start of the image forming job (S1). The main controller 101 makes reference to the acquired image data, and discriminates whether or not the image data includes the varnish image data for each of pages of the recording materials S (S2). For example, in the case of an example shown in part (a) of FIG. 7, in the image data, varnish image data for a varnish image 702 is included together with toner image data for a toner image 701 (first toner image).

In the case where the varnish image data is not included in the image data (No of S2), the main controller 101 jumps to processing of a step S12, and carries out image output for forming the toner image on the basis of the toner image data (S12). In this case, in the image data, the varnish image data is not included, so that the main controller 101 does not form the varnish image 702 shown in part (b) of FIG. 7, but forms only the toner image 701 shown in part (c) of FIG. 7. Thereafter, the main controller 101 causes the processing to go to processing of a step S13 (described later).

On the other hand, in the case where the varnish image data is included in the image data (Yes of S2), the main controller 101 acquires information on a predetermined varnish coating region (X) in which the varnish image 702 is formed from the varnish image data (S3). Further, the main controller 101 acquires information on a predetermined toner image region (Y) in which the toner image 701 is formed the toner image data (S4). Then, the main controller 101 discriminates whether or not there is an overlapping region overlapping with the varnish image 702 and the toner image 701 (S5).

The main controller 101 compares the information the information on the varnish coating region (X) and the information on the toner image region (Y) with each other, and in the case where both the varnish coating region (X) and the toner image region (Y) exists exist in the same coordinate, the main controller 101 discriminates that the overlapping region overlapping with the varnish image 702 and the toner image 701 exists. For example, in the case of the example shown in part (a) of FIG. 7, a part of coordinates of the toner image 701 is the same as a coordinate of a first region 702*a* of the varnish image 702, so that it is discriminated that the overlapping region overlapping with the varnish image 702 and the toner image 701 exists.

In the case where there is no overlapping region overlapping with the varnish image 702 and the toner image 701 (No of S5), for example, the case shown in part (f) of FIG. 7 corresponds to this case, but the main controller 101 prepares transparent toner image data for a transparent toner image 704 (second toner image) with transparent toner, which is monochromatic toner low in viewability by the user, so as to be superposed on the varnish coating region (X) for the varnish image 702 (S16). The transparent toner image data is associated with the same coordinate as information on the varnish coating region (X) for the varnish image 702. Incidentally, in the case of part (f) of FIG. 7, a varnish image other than the varnish image 702 may be formed superposedly on the toner image region (Y) for the toner image 701.

Further, the main controller 101 combines the transparent toner image data prepared in the step S16 with acquired image data (S17), and carries out image formation on the basis of the combined image data (S12). At this time, on the basis of the transparent toner image data, an electrostatic latent image for forming the transparent toner image is formed in the image forming portion Pe by an exposure device 5*e*. Thereafter, the main controller 101 causes the processing to go to a step S13 (described later).

In the case where the overlapping region overlapping with the varnish image 702 and the toner image 701 does not exist, as shown in part (f) of FIG. 7, the toner image 701 is formed on the basis of the toner image data, and in addition, the transparent toner image 704 is formed on the basis of the transparent toner image data. Thereafter, the varnish image 702 is formed on the basis of the varnish image data, but the varnish image 702 is formed superposedly on the transparent toner image 704 in the same size as the transparent toner image 704. Further, in this case, it is preferable that an area ratio (Dc) of the transparent toner image 704 is set at "100%". This is because the toner image area ratio is closer to "100%" and, due to a wax contained in the toner, the contact angle of the varnish to the toner image can be made larger, so that the varnish image does not readily cause the "bleeding". Thus, the contact angle of the varnish to the transparent toner image 704 is made larger than the contact angle of the varnish to the white background portion 760, so that it is possible to make it hard to cause the "bleeding" on the varnish image 702. Incidentally, in this embodiment, in the case where a maximum toner application amount per unit area of each of the toner images is set at "100%", a ratio of a toner application amount per unit area of a toner image to be formed is referred to as an "area ratio".

On the other hand, in the case where the overlapping region overlapping with the varnish image 702 and the toner image 701 exists (Yes of S5), the main controller 101 acquires an area (Sz) of a non-overlapping region (Z) as shown in part (d) of FIG. 7 such that, of the varnish image 702, a region overlapping with the toner image 701 is removed (S6). The non-overlapping region (Z) is a portion where the varnish image 702 is formed on the white background portion 760 (non-image region) where the toner image 701 is not formed on the recording material S. Further, the main controller 101 discriminates whether or not the area (Sz) of the non-overlapping region (Z) is larger than "O" and is smaller than an area (Sx) of the varnish coating region (X) (S7).

In the case of "No" in the step S7, the main controller 101 makes image output on the basis of the image data acquired in the step S1 (S12). For example, as shown in part (g) of FIG. 7, the case where the varnish image 702 is formed superposedly on the toner image 701 without extending over the white background portion 760 corresponds to this case (Sz=0). In this case, the varnish image 702 is formed superposedly on the toner image 701 [low] lower in wettability than the white background portion 760, so that the varnish image 702 does not readily cause the "bleeding". Accordingly, the transparent toner image is not formed. Incidentally, in the case where a portion of the varnish coating region (X) where the varnish image 702 shown in part (g) of FIG. 7 is the white background portion 760, it is discriminated that the overlapping region overlapping with the varnish image 702 and the toner image 701 does not exist (No of S5), and a transparent toner image with the same size as the varnish image 702 may be formed in the same position as the varnish image 702 as described later.

In the case of "Yes" in the step S7, the main controller 101 acquires an area ratio (Dt) of the non-overlapping region (Z) (S8), and discriminates whether or not the area ratio (Dt) of the non-overlapping region (Z) is lower than "100%" (S9). For example, as shown in part of FIG. 7, the case where the varnish image 702 is formed superposedly on a part of the toner image 701 so as to extend over the white background portion 760 corresponds to this case. In the case where the area ratio (Dt) of the non-overlapping region (Z) is "100%" or more (No of S9), the main controller 101 prepares the transparent toner image data for forming the transparent toner image 704 shown in part (e) of FIG. 7 by using transparent toner in the non-overlapping region (Z) (S14). In this case, the area ratio (Dc) of the transparent toner image is set at "100%".

Then, the main controller 101 combines the transparent toner image data prepared in the step S14 with the acquired image data (S15), and makes image output on the basis of the combined image data (S12). Therefore, the main controller 101 causes the processing to go to the processing of the step S13 (described later). As shown in part (c) of FIG. 7, the main controller 101 forms the toner image 701 on the basis of the toner image data before the varnish image 702 is formed, and in addition, forms the transparent toner image 704 shown in part (e) of FIG. 7 on the basis of the transparent toner image data. Then, the main controller 101 forms the varnish image 702 shown in part (b) of FIG. 7 on the basis of the varnish image data. The varnish image 702 overlaps with the transparent toner image 704 in the same size as the transparent toner image 704 in the non-overlapping region (Z) shown in part (d) of FIG. 7 where the varnish image 702 does not overlap with the toner image 701.

Thus, the varnish image 702 is superposed on the transparent toner image 704 in the non-overlapping region (Z), so that the contact angle of the varnish to the transparent toner image 704 becomes equivalent to the contact angle of the varnish to the toner image 701. That is, the contact angle of the varnish to the transparent toner image 704 becomes larger than the contact angle of the varnish to the white background portion 760. By this, the varnish image 702 does not cause the "bleeding".

On the other hand, in the case where the area ratio (Dt) of the non-overlapping region (Z) is lower than "100%" (Yes of S9), the main controller 101 prepares the transparent toner image data for forming the transparent toner image 704 shown in part (e) of FIG. 7 by using the transparent toner in the non-overlapping region (Z) (S10). In this case, the area ratio (Dc) of the transparent toner image 704 is set at a value equal to a value of the area ratio (Dc) of the toner image 701 in a region (702*a* in part (a) of FIG. 7) in which the varnish image 702 and the toner image 701 overlap with each other. That is, in this embodiment, in the case where the varnish image 702 is formed so as to extend over the toner image 701 and the white background portion 760, the toner application amount of the transparent toner image is set so that an angle difference between a contact angle of the varnish used for the varnish image 702 in an adjacent portion 800, of the toner image 701, which is adjacent to the white background portion 760 and in which the varnish image 702 is formed and a contact angle of the varnish used for the varnish image 702 in the transparent toner image 704 is made "3" or less, Thus, the difference in contact angle of the varnish is made "3" or less, so that it is made hard to cause the "bleeding" in the varnish image. In the case of this embodiment, as shown in FIG. 8, the contact angle of the varnish to the white background portion 760 was "10°", and the contact angles of the varnish to the toner image 701 and to the transparent toner image 704 were "13°".

Further, the main controller 101 combines the transparent toner image data prepared in the step S10 with the acquired image data (S11), and makes image output on the basis of the combined image data (S12). In this case, the main controller 101 forms the toner image 701 on the basis of the toner image data, and in addition, forms the transparent toner image 704 on the basis of the transparent toner image data. Thereafter, the main controller 101 forms the varnish image 702 on the basis of the varnish image data. The varnish image 702 is formed superposedly on the transparent toner image 704 in the same size as the transparent toner image 704 in the non-overlapping region (Z) where the varnish image 702 does not overlap with the toner image 701.

Thereafter, the main controller 101 causes the processing to go to the processing of S13 (described later).

In the processing of S13, the main controller 101 discriminates whether or not the image forming job is ended, in the case where the image forming job is ended (Yes of S13), the main controller 101 ends the image forming job. In the case where the image forming job is not ended (No of S13), the main controller 101 causes the processing to return to the processing of S2, and repeats the above-described processings.

In a table 1, a result of evaluation of occurrence or no occurrence of the "bleeding" of the varnish is shown.

TABLE 1

| | | |
|---|---|---|
| ONOP*[1] | YES | NO |
| ONOB*[2] | NO | YES |

*[1]"ONOP" is occurrence (YES) or non-occurrence (NO) of the processing.
*[2]"ONOB" is occurrence (YES) or non-occurrence (NO) of the bleeding.

As shown in the table 1, by performing the above-described processing, it is possible to suppress the occurrence of the "bleeding" in the varnish image. This is because in the case where the processing in this embodiment is not carried out, on the recording material S, the contact angle of the varnish to the white background portion is lower than the contact angle of the varnish to the toner image, i.e., wettability of the varnish on the white background portion is higher than the wettability of the varnish on the toner image, so that the varnish is liable to wet and expand. The reason why the contact angle of the varnish becomes higher to the toner image than to the white background portion is due to the wax contained in the toner. Further, in this embodiment, the reason why the varnish contact angle is the same between the transparent toner image 704 and the toner image 701 is that a principal difference between the toner for the transparent toner image 704 and the toner for the toner image 701 is a difference in pigment and that there is no difference in wax relating to the varnish contact angle.

As described above, in this embodiment, in the case where a portion of the varnish coating region (X) in which the varnish image 702 is formed is the white background portion 760, the transparent toner image 704 is formed with the transparent toner in a position overlapping with the varnish image 702. On the white background portion 760 of the recording material S, the transparent toner image 704 is formed as a background portion, and the varnish image 702 is formed superposedly on the transparent toner image 704, so that wettability can be lowered compared with the case of only the white background portion 760, with the result that the "bleeding" of the varnish image occurrence in the case of only the white background portion 760 can be suppressed. Further, in the case where the varnish image 702 is formed so as to extend over the toner image 701 and the white background portion 760, the difference between the contact angle of the varnish to the toner image 701 and the contact angle of the varnish to the transparent toner image 704 is adjusted by the toner application amount of the transparent toner image, so that the "bleeding" of the varnish image is suppressed.

Second Embodiment

Next, "image forming processing" in a second embodiment will be described using FIG. 9 to part (f) of FIG. 10 while making reference to FIG. 3. Incidentally, in the image forming processing in this embodiment shown in FIG. 9, processings which are the same as those in the image forming processing (see FIG. 6) in the above-described first embodiment are represented by the same step numbers (symbols) and will be briefly described or omitted from description.

As shown in FIG. 9, the main controller 101 acquires image data stored in the RAM 104 with the start of the image forming job (S1). The main controller 101 makes reference to the acquired image data, and discriminates whether or not the image data includes the varnish image data for each of pages of the recording materials S (S2). In the case where the varnish image data is not included in the image data (No of S2), the main controller 101 jumps to processing of a step S12, and carries out image output for forming the toner image on the basis of the toner image data (S12). In this case, in the image data, the varnish image data is not included, so that the main controller 101 forms only the toner image. Thereafter, the main controller 101 causes the processing to go to processing of the step S13.

On the other hand, in the case where the varnish image data is included in the image data (Yes of S2), the main controller 101 acquires information on a predetermined varnish coating region (X) in which the varnish image 1002 is formed from the varnish image data (S3). Further, the main controller 101 acquires information on a predetermined toner image region (Y) in which the toner image 1001 is formed the toner image data (S4).

Then, the main controller 101 compared varnish image data and toner image data with each other, and discriminates whether or not there is a non-overlapping region (called outermost varnish region) which does not overlap with the toner image 1001 in a region defining on outer edge of the varnish image 1002 (S21). In the case of the example shown in part (a) of FIG. 10, a coordinate of a first region 1002*a* of the varnish image 1002 is the same as a coordinate of the toner image 1001, so that in the region defining the outer edge of the varnish image 1002, as shown in part (b) of FIG. 10, a region defining an outer edge of a second region 1002*b* (non-overlapping region) excluding the first region 1002*a* corresponds to an outermost varnish region 1003. In other words, the outermost varnish region 1003 is a contour portion, of a portion (1002*b*) where the varnish image 1002 is formed on the white background portion 760, corresponding to a contour of the varnish image 1002.

In the case where there is no outermost varnish region 1003 in the varnish image 1002 (No of S21), for example, the case shown in part (c) of FIG. 10 corresponds to this case, but the main controller 101 causing the processing to jump to the processing of the step S12, and makes image output for forming the toner image 1001 and the varnish image 1002 (S12). An example shown in part (c) of FIG. 10 is the case where when the white background portion 760 exists at a central portion of the toner image 1001 so as to be surrounded by the toner image 1001 as shown in part (e) of FIG. 10, the varnish image 1002 as shown in part (d) of FIG. 10 is formed superposedly on the toner image 1001 and the white background portion 760 so as to extend over the toner image 1001 and the white background portion 760. In this case, in the second embodiment, different from the first embodiment, the transparent toner image is not formed on the white background portion 760 in order to suppress consumption of the transparent toner (see a table 2 appearing hereinafter). Thereafter, the main controller 101 causes the processing to go to the processing of the step S13.

In the case where the outermost varnish region 1003 exists in the varnish image 1002 (Yes of S21), for example, the case shown in part (a) of FIG. 10 corresponds to this case, but the main controller 101 prepares transparent toner image data for forming a transparent toner image 1006 shown in part (b) of FIG. 10 in the outermost varnish region 1003 by using the transparent toner (S22). Inside the outermost varnish region 1003, the transparent toner image is not formed. Then, an area ratio (Dc) of the transparent toner image 1006 formed in the outermost varnish region 1003 is set at "100%". B setting the area ratio (Dc) of the transparent toner image 1006 at "100%", even when the varnish bleeds in the varnish image 1002 inside the outermost varnish region 1003, expansion of the bleeding over the outermost varnish region 1003 is suppressed.

Further, the main controller 101 combines the transparent toner image data prepared in the step S22 with the acquired image data (S23), and makes image output on the basis of the combined image data (S12). In this case, as shown in part (a) of FIG. 10, the main controller 101 forms the toner image 1001 on the basis of the toner image data, and in addition, forms the transparent toner image 1006 (see part (b) of FIG. 10) on the basis of the transparent toner image data. Thereafter, the main controller 101 forms the varnish image 1002 on the basis of the varnish image data. Thus, the transparent toner image 1006 is formed in the outermost varnish region 1003 of the varnish image 1002. A line width of the transparent toner image 1006 is "1 mm", for example.

In the processing of S13, the main controller 101 discriminates whether or not the image forming job is ended. In the case where the image forming job is ended (Yes of S13), the main controller 101 ends the image forming job. In the case where the image forming job is not ended (No of S13), the main controller 101 causes the processing to return to the processing of S2, and repeats the above-described processings.

Also, in the case of the above-described second embodiment, a result of evaluation of occurrence or non-occurrence of the "bleeding" of the varnish image was the same as the result in the above-described table 1. By carrying out the processing in the second embodiment, similarly as in the first embodiment, it is possible to suppress the occurrence of the "bleeding" in the varnish image. Also, in the case of the second embodiment, the contact angle of the varnish to the white background portion 760 was "10°", and the contact angle of the varnish to each of the toner image 1001 and the transparent toner image 1006 was "13°" (see FIG. 8). Accordingly, in the outermost varnish region 1003 of the varnish image 1002, the varnish contact angle to the transparent toner image 1006 is larger than the varnish contact angle to the white background portion 760, so that the "bleeding" does not readily occur in the outermost varnish region 1003. On the other hand, a portion inside the outermost varnish region 1003 of the varnish image 1002 is the white background portion 1006, so that the "bleeding" can occur. However, the transparent toner image 1006 is formed in the outermost varnish region 1003, so that even when the varnish causes the bleeding inside the outermost varnish region 1003 of the varnish image 1002 due to the wettability of the transparent toner image 1006, the bleeding varnish is made hard to protrude to an outside of the varnish coating region.

Further, in the case of the second embodiment, compared with the case of the above-described first embodiment, an amount of consumption of the transparent toner can be suppressed. Here, a transparent toner image forming pattern when each of the first embodiment and the second embodiment which are described above is carried out is shown in a table 2. An example shown in part (a) of FIG. 10 ("FIG. 10(*a*)") is the same as the example shown in part (a) of FIG. 7, and is the case where the varnish image 1002 is formed superposedly on a part of the toner image 1001 so as to extend over the white background portion 760. Part (c) of FIG. 10 ("FIG. 10(*c*)") is the case where the varnish image 1002 is formed superposedly on the toner image 1001 and the white background portion 760 (see a broken-line portion) surrounded by the toner image 1001 so as to extend over the toner image 1001 and the white background portion 760.

TABLE 2

| TONER IMAGE & | CLEAR TONER IMAGE | |
|---|---|---|
| VARNISH IMAGE | FIRST EMB. | SECOND EMB. |
| FIG. 10(a) | FIG. 7(e) | FIG. 10(b) |
| FIG. 10(c) | FIG. 10(f) | NO |

In the case of the example shown in part (a) of FIG. 10, the transparent toner image is formed in both the first embodiment and the second embodiment. However, in the case of the first embodiment, the transparent toner image 704 is formed in an entire area of the non-overlapping region (Z) (see part (d) of FIG. 7 and part (e) of FIG. 7 ("FIG. 7(*e*)"). On the other hand, in the case of the second embodiment, the transparent toner image is not formed in an entire area of the non-overlapping region (Z), but the transparent toner image 1006 is formed only in the outermost varnish region 1003, i.e., only in a part of the second region 1002*b* (non-overlapping region) (see part (b) of FIG. 10 "FIG. 10(*b*)"). Accordingly, consumption of the transparent toner can be to be suppressed. Further, in the case of part (c) of FIG. 10, in the case of the first embodiment, a transparent toner image 1007 which is as shown in part (f) of FIG. 10 ("FIG. 10(*f*)") and which has the same size as the white background portion 760 (see a broken-line portion) is formed. On the other hand, in the second embodiment, the transparent toner image 1007 as shown in part (f) of FIG. 10 is not formed.

As described above, also in this embodiment, as the background portion of the varnish image 1002, the transparent toner image 1006 is formed with the transparent toner, but is formed in the outermost varnish region 1003. On the white background portion 760 of the recording material S, the transparent toner image 1006 is formed as the background portion, so that an effect similar to the effect of the above-described first embodiment such that wettability can be lowered compared with the case of only the white background portion 760, with the result that the "bleeding" of the varnish image occurred in the case of only the white background portion 760 can be suppressed can be obtained. Further, in the case of the second embodiment, the transparent toner image is not formed inside the outermost varnish region, so that in the case where the varnish image is formed so as to extend over the toner image and the white background portion, compared with the above-described first embodiment, an amount of consumption of the transparent toner can be suppressed.

OTHER EMBODIMENTS

Incidentally, in the above-described first and second embodiments, the toner image formed for suppressing the "bleeding" of the varnish image is formed with the transparent toner which is the toner low in viewability as viewed from the user, but the present invention is not limited to this. As the toner low in viewability, monochromatic toner close in color to the color of the recording material S may be used.

For example, in the case where the color of the recording material S is white, white toner or yellow toner may be used. However, in the case where the yellow toner is used, it is preferable that the area ratio of the toner is made as low as possible in order not to cause the "bleeding" in the varnish image and thus the viewability is made low.

Incidentally, the present invention may also employ the following constitutions.

(1) An image forming system comprising:

an image forming apparatus capable of forming a toner image on a recording material;

a varnish applying apparatus capable of forming a varnish image on the recording material by ejecting varnish on the recording material; and a controller configured to control the image forming apparatus and the varnish applying apparatus, wherein the toner image formed on the recording material by the image forming apparatus on the basis of inputted first image data is a first toner image, and an image formed on the recording material by the varnish applying apparatus on the basis of inputted second image data is the varnish image, and wherein in a case that the varnish image is formed in a non-image region where the first toner image is not formed, before the varnish image is formed, a second toner image is formed with monochromatic toner by the image forming apparatus on a portion of the non-image region where the varnish image is formed.

(2) An image forming system according to the above-described (1), wherein the monochromatic toner is transparent toner.

(3) An image forming system according to the above-described (1), wherein the monochromatic toner is white toner.

(4) An image forming system according to any one of the to above-described (1), (2), and (3), wherein in a case that the varnish image is formed so as to extend over the first toner image and the non-image region, the controller controls a toner application amount of the second toner so that a difference in angle between a contact angle of the varnish used for the varnish image in an adjacent portion, of the first toner image, which is adjacent to the non-image region and in which the varnish image is formed and a contact angle of the varnish used for the varnish image in the second toner image is made 3° or less.

(5) An image forming system according to the above-described (4), wherein in the case that the varnish image is formed so as to extend over the first toner image and the non-image region, the controller controls the toner application amount of the second toner so as to be equal to a toner application amount of the first toner in the area ratio.

(6) An image forming system comprising:

an image forming apparatus capable of forming a toner image on a recording material;

a varnish applying apparatus capable of forming a varnish image on the recording material by ejecting varnish on the recording material; and a controller configured to control the image forming apparatus and the varnish applying apparatus, wherein the toner image formed on the recording material by the image forming apparatus on the basis of inputted first image data is a first toner image, and an image formed on the recording material by the varnish applying apparatus on the basis of inputted second image data is the varnish image, and wherein in a case that the varnish image is formed in a non-image region where the first toner image is not formed, before the varnish image is formed, a second toner image is formed with monochromatic toner by the image forming apparatus on a contour portion, of a portion of the non-image region where the varnish image is formed, corresponding to a contour of the varnish image, and no toner image is formed inside the contour portion.

(7) An image forming system according to the above-described (6), wherein the monochromatic toner is transparent toner.

(8) An image forming system according to the above-described (6), wherein the monochromatic toner is white toner.

(9) An image forming system comprising:

an image forming apparatus capable of forming a toner image on a recording material;

a varnish applying apparatus capable of forming a varnish image on the recording material by ejecting varnish on the recording material; and a controller configured to control the image forming apparatus and the varnish applying apparatus, wherein the toner image formed on the recording material by the image forming apparatus on the basis of inputted first image data is a first toner image, and an image formed on the recording material by the varnish applying apparatus on the basis of inputted second image data is the varnish image, and wherein in a case that the varnish image is formed in a non-image region where the first toner image is not formed, when a portion of the non-image region where the varnish image is formed is not surrounded by the first toner image, before the varnish image is formed, a second toner image is formed with monochromatic toner by the image forming apparatus on the portion of the non-image region, and when the portion of the non-image region is surrounded by the first toner, no toner image is formed with the monochromatic toner on the portion of the non-image region.

(10) An image forming system according to the above-described (b), wherein the monochromatic toner is transparent toner.

(11) An image forming system according to the above-described (9), wherein the monochromatic toner is white toner.

(12) An image forming system according to any one of the above-described (9), (10), and (11), wherein in a case that the varnish image is formed so as to extend over the first toner image and the non-image region, the controller controls a toner application amount of the second toner so that a difference in angle between a contact angle of the varnish used for the varnish image in an adjacent portion, of the first toner image, which is adjacent to the non-image region and in which the varnish image is formed and a contact angle of the varnish used for the varnish image in the second toner image is made 3° or less.

(13) An image forming system according to the above-described (12), wherein the controller controls the toner application amount of the second toner so as to be equal to a toner application amount of the first toner in the area ratio.

(14) An image forming system according to any one of the above-described (1) to (13), wherein the varnish is UV varnish of an ultraviolet solidifiable type, and wherein the varnish applying apparatus solidifies the UV varnish by irradiating the UV varnish with ultraviolet radiation.

According to the present invention, the varnish image is formed on the second toner image before the varnish image is formed in the non-image region where the first toner image is not formed, so that the varnish becomes hard to bleed and thus it is possible to suppress that the varnish image protrudes from the predetermined varnish coating region.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-118393 filed on Jul. 26, 2022, which is hereby incorporated by reference herein in its entirety.

What is claimed is:

1. An image forming system comprising:

an image forming apparatus configured to form a toner image on a recording material;

a varnish applying apparatus configured to apply varnish on the recording material to form a varnish image on the recording material; and a controller configured to control the image forming apparatus, in a case where the varnish image is to be formed in a non-image region where a first toner image is not formed, to form a second toner image with monochromatic toner on a portion where the varnish image is to be formed in the non-image region before the varnish image is formed, wherein the toner image formed on the recording material by the image forming apparatus on the basis of inputted first image data is a first toner image, and an image formed on the recording material by the varnish applying apparatus on the basis of inputted second image data is the varnish image.

2. The image forming system according to claim 1, wherein the monochromatic toner is transparent toner.

3. The image forming system according to claim 1, wherein the monochromatic toner is white toner.

4. The image forming system according to claim 1, wherein in a case where the varnish image is formed so as to extend over the first toner image and the non-image region, the controller controls a toner application amount of the second toner so that a difference in angle between a contact angle of the varnish used for the varnish image in an adjacent portion, of the first toner image, which is adjacent to the non-image region and in which the varnish image is formed and a contact angle of the varnish used for the varnish image in the second toner image is made 3° or less.

5. The image forming system according to claim 4, wherein in the case where the varnish image is formed so as to extend over the first toner image and the non-image region, the controller controls the toner application amount of the second toner image so as to be equal to a toner application amount of the first toner image in the adjacent portion.

6. The image forming system according to claim 1, wherein the controller controls the image forming apparatus to form no toner image with the monochromatic toner on the portion in the non-image region, in a case where the portion is surrounded by the first toner image.

7. The image forming system according to claim 1, wherein the varnish is UV varnish of an ultraviolet solidifiable type, and wherein the varnish applying apparatus solidifies the UV varnish by irradiating the UV varnish with ultraviolet radiation.

8. An image forming system comprising:

an image forming apparatus configured to form a toner image on a recording material;

a varnish applying apparatus configured to apply varnish on the recording material to form a varnish image on the recording material; and a controller configured to control the image forming apparatus, in a case where the varnish image is to be formed in a non-image region where a first toner image is not formed, to form a second toner image with monochromatic toner on a contour portion of an area where the varnish image is to be formed in the non-image region before the varnish image is formed, wherein the contour portion corresponds to a contour of the varnish image, and wherein the toner image formed on the recording material by the image forming apparatus on the basis of inputted first image data is a first toner image, and an image formed on the recording material by the varnish applying apparatus on the basis of inputted second image data is the varnish image.

9. The image forming system according to claim 8, wherein the monochromatic toner is transparent toner.

10. The image forming system according to claim 8, wherein the monochromatic toner is white toner.

11. The image forming system according to claim 8, wherein the controller controls the image forming apparatus to form no toner image with the monochromatic toner on the area in the non-image region, in a case where the area is surrounded by the first toner image.

12. The image forming system according to claim 8, wherein the varnish is UV varnish of an ultraviolet solidifiable type, and wherein the varnish applying apparatus solidifies the UV varnish by irradiating the UV varnish with ultraviolet radiation.

* * * * *